United States Patent
Mills

(10) Patent No.: US 10,473,772 B2
(45) Date of Patent: Nov. 12, 2019

(54) VEHICLE SENSOR OPERATION

(71) Applicant: Ford Global Technologies, LLC, Dearborn, MI (US)

(72) Inventor: Graham Mills, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 15/782,031

(22) Filed: Oct. 12, 2017

(65) Prior Publication Data

US 2019/0113608 A1 Apr. 18, 2019

(51) Int. Cl.

| | | |
|---|---|---|
| *G06T 7/80* | (2017.01) | |
| *G01S 7/497* | (2006.01) | |
| *G06T 7/70* | (2017.01) | |
| *G05D 1/00* | (2006.01) | |
| *G05D 1/02* | (2006.01) | |
| *G06T 19/20* | (2011.01) | |
| *G01S 7/48* | (2006.01) | |
| *G01S 7/295* | (2006.01) | |
| *G01S 13/86* | (2006.01) | |

(Continued)

(52) U.S. Cl.
CPC .......... *G01S 7/4972* (2013.01); *G05D 1/0011* (2013.01); *G05D 1/024* (2013.01); *G05D 1/0231* (2013.01); *G06T 7/70* (2017.01); *G06T 7/80* (2017.01); *G06T 19/20* (2013.01); *G01S 7/295* (2013.01); *G01S 7/4808* (2013.01); *G01S 13/86* (2013.01); *G01S 13/89* (2013.01); *G01S 2013/9364* (2013.01); *G01S 2013/9367* (2013.01); *G01S 2013/9382* (2013.01)

(58) Field of Classification Search
CPC ........ G01S 7/4972; G01S 13/86; G01S 13/89; G01S 2013/9364; G01S 2013/9367; G01S 2013/9382; G05D 1/0011; G05D 1/0231; G05D 1/024; G06T 19/20; G06T 7/70–80
See application file for complete search history.

(56) References Cited

U.S. PATENT DOCUMENTS

| | | | | |
|---|---|---|---|---|
| 5,732,158 A | * | 3/1998 | Jaenisch | G06T 7/60 |
| | | | | 358/464 |
| 6,118,886 A | * | 9/2000 | Baumgart | G06K 9/6292 |
| | | | | 382/103 |

(Continued)

FOREIGN PATENT DOCUMENTS

| | | |
|---|---|---|
| CN | 103759670 A | 4/2014 |
| CN | 105866762 A | 8/2016 |

OTHER PUBLICATIONS

Nouira et al., "Point Cloud Refinement with a Target-Free Intrinsic Calibration of a Mobile Multi-Beam Lidar System", https://hal-mines-paristech.archives-ouvertes.fr/hal-01374068v1, downloaded Jul. 21, 2017.

(Continued)

*Primary Examiner* — Sean T Motsinger
(74) *Attorney, Agent, or Firm* — Frank A. MacKenzie; Bejin Bieneman PLC

(57) ABSTRACT

A system, comprising a processor; and a memory, the memory storing instructions executable by the processor to receive image data from a vehicle sensor installed in a vehicle, transform the image data into global coordinate data, estimate fractal dimension values of the global coordinate data, and determine calibrated parameters based on the fractal dimension values to operate the vehicle sensor.

20 Claims, 3 Drawing Sheets

(51) Int. Cl.
*G01S 13/89* (2006.01)
*G01S 13/93* (2006.01)

(56) References Cited

U.S. PATENT DOCUMENTS

| | | | | |
|---|---|---|---|---|
| 6,422,998 | B1* | 7/2002 | Vo-Dinh | G06F 17/17 |
| | | | | 600/300 |
| 6,677,858 | B1* | 1/2004 | Faris | G06Q 30/06 |
| | | | | 340/573.1 |
| 9,007,368 | B2* | 4/2015 | Laffargue | G06T 17/20 |
| | | | | 345/419 |
| 9,297,899 | B2* | 3/2016 | Newman | G01S 7/4808 |
| 9,497,380 | B1* | 11/2016 | Jannard | H04N 5/23238 |
| 9,582,881 | B2* | 2/2017 | Natroshvili | H04N 17/002 |
| 9,881,349 | B1* | 1/2018 | Meier | G06T 1/0014 |
| 2004/0201587 | A1* | 10/2004 | Mizusawa | G06T 15/20 |
| | | | | 345/427 |
| 2009/0087029 | A1* | 4/2009 | Coleman | G06K 9/00208 |
| | | | | 382/103 |
| 2009/0297055 | A1* | 12/2009 | Panda | G06K 9/4609 |
| | | | | 382/249 |
| 2011/0153362 | A1* | 6/2011 | Valin | G06Q 20/105 |
| | | | | 705/3 |
| 2014/0336953 | A1* | 11/2014 | Johnson | G01N 21/538 |
| | | | | 702/24 |
| 2016/0026253 | A1* | 1/2016 | Bradski | G02B 27/225 |
| | | | | 345/8 |
| 2016/0129917 | A1 | 5/2016 | Gariepy et al. | |
| 2016/0275682 | A1* | 9/2016 | Natroshvili | H04N 17/002 |
| 2017/0245761 | A1* | 8/2017 | Piron | A61B 5/055 |
| 2018/0232947 | A1* | 8/2018 | Nehmadi | G06T 17/05 |
| 2019/0094981 | A1* | 3/2019 | Bradski | H04N 13/204 |
| 2019/0110727 | A1* | 4/2019 | Egi | A61B 5/165 |

OTHER PUBLICATIONS

Nouira et al., "Target-Free Extrinsic Calibration of a Mobile Multi-Beam Lidar System", ISPRS Annals of the Photogrammetry, Remote Sensing and Spatial Information Sciences, vol. II-3/W5, 2015 ISPRS Geospatial Week 2015, Sep. 28-Oct. 3, 2015, La Grande Motte, France.

Molteno, "Fast O(N) box-counting algorithm for estimating dimensions", Physical Review E, vol. 48, No. 5, Nov. 1993.

Sheehan et al., "Automatic Self-Calibration of a Full Field-Of-View 3D n-Laser Scanner", Mobile Robotics Group, Oxford University, published in The International Journal of Robotics Research 2012.

Glennie et al., "Static Calibration and Analysis of the Velodyne HDL-74E S2 for High Accuracy Mobile Scanning", Remote Sensing 2010, 2, 1610-1624; doi:10.330/rs2061610; www.mdpi.com/journal/remotesensing.

Jimenez et al., "Fast box-counting algorithm on GPU", Computer Methods and Programs in Biomedicine 108 (2012) 1229-1242; www.intl.elsevierhealth.com/journals/cmpb.

* cited by examiner

VEHICLE SENSOR OPERATION

BACKGROUND

Sensors collect data around a vehicle. A computer in the vehicle can use the data to operate one or more vehicle components. The data can include data of, e.g., a roadway, objects on and/or adjacent to the roadway, other vehicles, etc. The computer can construct a virtual representation of the surrounding environment with the data. It is a problem to calibrate the sensors to collect data with desirable precision.

DETAILED DESCRIPTION

Figure 1:
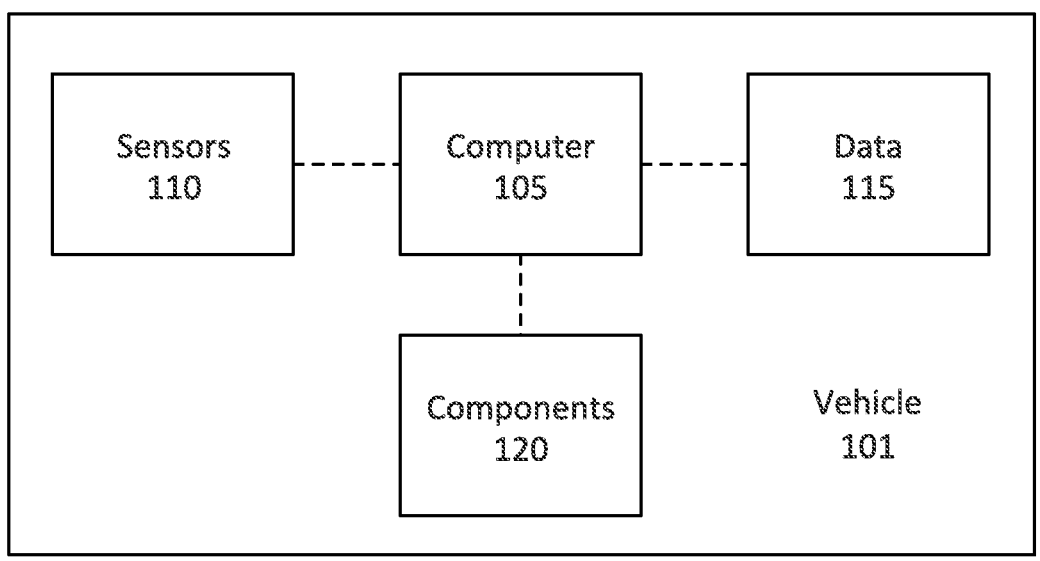
FIG. 1 is a block diagram of an example system for operating a vehicle.

A system includes a processor and a memory, the memory storing instructions executable by the processor to receive image data from a vehicle sensor installed in a vehicle, transform the image data into global coordinate data, estimate fractal dimension values of the global coordinate data, and determine calibrated parameters based on the fractal dimension values to operate the vehicle sensor.

The instructions can further include instructions to estimate a fractal dimension value for each of a plurality of stored parameters used to transform the image data into the global coordinate data.

The instructions can further include instructions to determine the calibrated parameters by identifying stored parameters associated with smallest fractal dimension values of the global coordinate data.

The parameters can include parameters for six dimensions in a global coordinate system. The instructions can further include instructions to determine a fractal dimension value for set of parameters for the six dimensions.

The instructions can further include instructions to transform the data with the parameters into sensor coordinate data and to transform the sensor coordinate data with the predetermined parameters into the global coordinate data.

The instructions can further include instructions to transform the sensor coordinate data with the predetermined parameters into vehicle coordinate data.

The instructions can further include instructions to actuate the sensor to collect data around the vehicle.

The instructions can further include instructions to receive data from a plurality of sensors and to determine the calibrated parameters based on the estimated fractal dimension values of the data from different sensors.

The instructions can further include instructions to estimate the fractal dimension values with a cost function.

The instructions can further include instructions instruct the vehicle sensor to collect additional image data, apply the calibrated parameters to the collected image data to transform the additional image data into additional global coordinate data, and to actuate a vehicle component based on the additional global coordinate data.

A method includes receiving image data from a vehicle sensor installed in a vehicle, transforming the image data into global coordinate data, estimating fractal dimension values of the global coordinate data, and determining calibrated parameters based on the fractal dimension values to operate the vehicle sensor.

The method can further include estimating a fractal dimension value for each of a plurality of stored parameters used to transform the image data into the global coordinate data.

The method can further include determining the calibrated parameters by identifying stored parameters associated with smallest fractal dimension values of the global coordinate data.

In the method, the parameters can include parameters for six dimensions in a global coordinate system, and the method can further include determining a fractal dimension value for each set of parameters for the six dimensions.

The method can further include transforming the data with the stored parameters into sensor coordinate data and transforming the sensor coordinate data with the predetermined parameters into the global coordinate data.

The method can further include receiving data from a plurality of sensors and determining the calibrated parameters based on the estimated fractal dimension values of the data from different sensors.

A system includes sensing means to provide data, and a computer programmed to receive image data from a vehicle sensor installed in a vehicle, transform the image data into global coordinate data, estimate fractal dimension values of the global coordinate data, and determine calibrated parameters based on the fractal dimension values to operate the vehicle sensor.

The computer can be further programmed to estimate a fractal dimension value for each of a plurality of stored parameters used to transform the image data into the global coordinate data.

The computer can be further programmed to determine the calibrated parameters by identifying stored parameters associated with smallest fractal dimension values of the global coordinate data.

The computer can be further programmed to receive data from a plurality of sensors and to determine the calibrated parameters based on the estimated fractal dimension values of the data from different sensors.

By selecting parameters for transforming raw sensor data into one or more coordinate systems based on the fractal dimension, the computer can map the raw data from the sensors into a coordinate system that allows the computer to actuate vehicle components based on the objects detected by the data. The parameters can be selected to calibrate the sensors. The fractal dimension is lowest when the data deviates the least from the object from which the data was collected. That is, a low fractal dimension can correspond to finer reading from the sensor. Thus, the sensors can be calibrated to collect more accurate information about objects around the vehicle.

FIG. 1 illustrates an example system 100 for operating a vehicle 101. A computer 105 in the vehicle 101 is programmed to receive data 115 from one or more sensors 110. For example, vehicle 101 data 115 may include a location of the vehicle 101, a speed of the vehicle 101, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with a network which may include various wired and/or wireless networking technologies, e.g., cellular, Bluetooth®, Bluetooth® Low Energy (BLE), wired and/or wireless packet networks, etc.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Data 115 may include a variety of data collected in a vehicle 101. Examples of data 115 are provided above, and moreover, data 115 are generally collected using one or more sensors 110, and may additionally include data calculated therefrom in the computer 105. In general, data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

Figure 2:
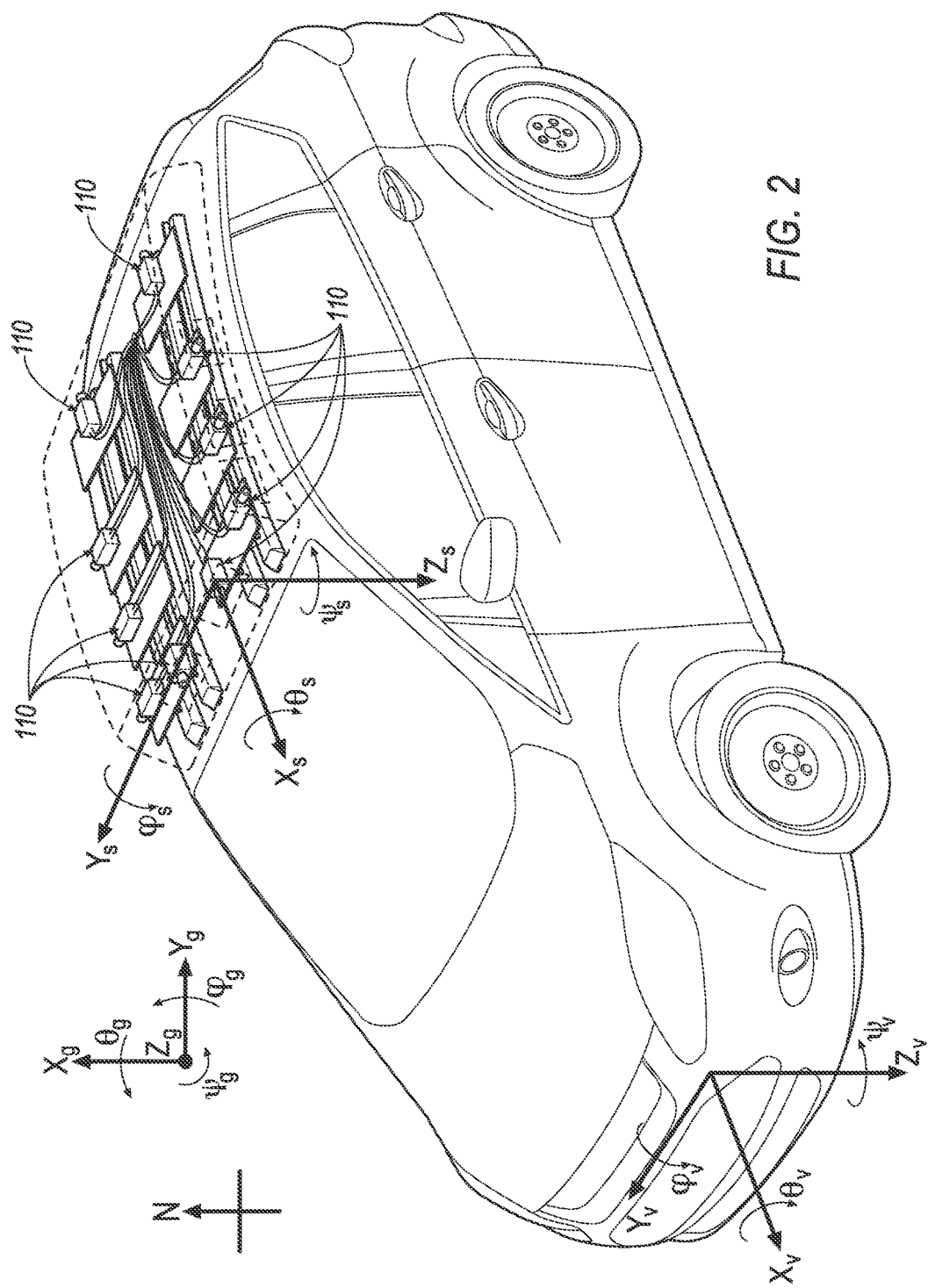
FIG. 2 is a perspective view of the vehicle with a plurality of sensors.

FIG. 2 is a perspective view of the vehicle 101 with the sensors 110. The sensors 110 can be positioned on a vehicle 101 roof to collect data 115 from around the vehicle 101. The computer 105 can use the data 115 form the sensors 110 to actuate one or more vehicle components 120. The computer 105 can calibrate the sensors 110 based on the data 115 collected by the sensors 110.

The computer 105 can collect data 115 from a sensor 110 in up to six dimensions, three spatial dimensions X, Y, Z and three rotational dimensions θ, φ, ψ. The sensor 110 can be, e.g., a camera, a lidar, an infrared emitter, etc., and the data 115 can thus be image data 115, i.e., a set of numerical arrays representing an image captured by the sensor 110. As used herein, a "dimension" has the conventional meaning of a direction in a coordinate system along which data 115 can be measured. The "spatial" dimensions are orthogonal axes in a 3-dimensional coordinate system, and the "rotational" dimensions are angular coordinates about each of the spatial dimensions. The rotational dimension θ is positive in the counterclockwise direction about an axis extending in the positive X direction. The rotational dimension φ is positive in the counterclockwise direction about an axis extending in the positive Y direction. The rotational dimension ψ is positive in the counterclockwise direction about an axis extending in the positive Z direction. The sensors 110 can collect data 115 of an environment and/or movement of the vehicle 101 in the six dimensions X, Y, Z, θ, φ, ψ.

The computer 105 can determine a fractal dimension of the data 115. As used herein, a "fractal dimension" is a measure of a curve, e.g., a non-integer Hausdorff dimension, a Minkowski dimension, etc., that describes a change in detail of the curve resulting from a change in measurement resolution of the curve. For example, the fractal dimension of the Sierpinski triangle is $$\frac{\log(3)}{\log(2)} \approx 1.58,.$$

The computer 105 can determine the fractal dimension using a conventional algorithm, e.g., a box-counting algorithm or other space-filling function. In the box-counting algorithm, an image from the data 115 is divided into a plurality of boxes of a specified side length ε. The magnitude of ε can be based on the measurement resolution of the sensor 110. The computer 105 can determine the number of boxes N in the image that have a value above an image value threshold determined by the computer 105 to indicate detection of an object with the data 115. The image value threshold can be determined based on a minimum predetermined image value indicating presence of an object. The computer 105 can then decrease the value of ε, dividing the image into a greater plurality of boxes having smaller side lengths, and determine another number of boxes N detecting an object in the image. The computer 105 can determine a set of values N for a plurality of box sizes S and determine a fractal dimension d of the image as described in Equation 1:

$$d = \lim_{\varepsilon \to 0} \frac{\log(N)}{\log\left(\frac{1}{\varepsilon}\right)} \quad (1)$$

The computer 105 can approximate the limit of the fractal dimension d from the number of boxes N for the plurality of side lengths ε with known techniques, e.g., a linear regression. Alternatively, the computer 105 can use another method to determine the fractal dimension d, e.g., a cost function that, when minimized, generates a value for the fractal dimension d.

The computer 105 can determine a plurality of values for the fractal dimension d for the data 115. The computer 105 can transform the raw data 115 from the sensor 110 into a sensor coordinate system. The sensor coordinate system can have sensor coordinate dimensions $X_s$, $Y_s$, $Z_s$, $\theta_s$, $\phi_s$, $\psi_s$ and an origin point at one of the sensors 110, as shown in FIG. 2. The computer 105 can transform the sensor coordinate data 115 into a vehicle coordinate system. The vehicle coordinate system can have vehicle coordinate dimensions $X_v$, $Y_v$, $Z_v$, $\theta_v$, $\phi_v$, $\psi_v$, and an origin point on the vehicle 101, e.g., at a leftmost point on the front bumper. The computer 105 can transform the vehicle coordinate data 115 into a global coordinate system. The global coordinate system can have coordinate dimensions $X_g$, $Y_g$, $Z_g$, $\theta_g$, $\phi_g$, $\psi_g$ and an origin point at a predetermined geo-location, e.g., a starting point of a route on which the vehicle 101 travels. The coordinate dimension $X_g$ in the positive direction can align with the north cardinal direction, and the coordinate dimension $Y_g$ in the positive direction can align with the east cardinal direction.

The computer 105 can transform the raw data 115 into the sensor coordinate system by applying a plurality of predetermined parameters to the raw data 115. The parameters are values that, when applied to the data 115, transform the data 115 into one of the sensor coordinate system, the vehicle coordinate system, and the global coordinate system. For example, the parameters can be a coordinate transform matrix that maps the raw data 115 into coordinates in one of the sensor coordinate system, the vehicle coordinate system, and the global coordinate system. The parameters can map each raw data 115 input into a six-dimensional array in one of the sensor coordinate system, the vehicle coordinate system, and the global coordinate system. Equation 2 below shows example parameters:

$$\begin{bmatrix} a_X & 0 & 0 & 0 & 0 & 0 \\ 0 & a_Y & 0 & 0 & 0 & 0 \\ 0 & 0 & a_Z & 0 & 0 & 0 \\ 0 & 0 & 0 & a_\theta & 0 & 0 \\ 0 & 0 & 0 & 0 & a_\phi & 0 \\ 0 & 0 & 0 & 0 & 0 & a_\psi \end{bmatrix} \begin{bmatrix} X \\ Y \\ Z \\ \theta \\ \phi \\ \psi \end{bmatrix} = \begin{bmatrix} X_a \\ Y_a \\ Z_a \\ \theta_a \\ \phi_a \\ \psi_a \end{bmatrix} \quad (2)$$

where $a_X$, $a_Y$, $a_Z$, $a_\theta$, $a_\phi$, $a_\psi$ are parameters that convert data in the coordinates X, Y, Z, $\theta$, $\phi$, $\psi$ into a different coordinate system $X_a$, $Y_a$, $Z_a$, $\theta_a$, $\phi_a$, $\psi_a$.

In another example, the sensor 110 can receive raw data 115 in the rotational dimensions $\theta$, $\phi$, $\psi$ and the computer 105 can transform the data 115 into spatial coordinates $X_s$, $Y_s$, $Z_s$ in the sensor coordinate system, e.g., according to Equation 3:

$$\begin{bmatrix} X_s \\ Y_s \\ Z_s \end{bmatrix} = \begin{bmatrix} b_1 \cos(\psi) \cdot (\sin(\phi)\cos(b_2) - \cos(\phi)\sin(b_2)) \\ b_3 \cos(\psi) \cdot (\cos(b_4)\cos(\phi) + \sin(b_4)\sin(\phi)) \\ b_5 \sin(\psi) + b_6 \end{bmatrix} \quad (3)$$

where $b_1$, $b_2$, $b_3$, $b_4$, $b_5$, $b_6$ are the parameters to transform the raw data 115 into the sensor coordinate system. That is, one of the sensors 110 can receive raw data 115 in units relative to the sensor 110, e.g., azimuth angle, elevation angle, range from the sensor 110, intensity of the light received by the sensor 110, etc. The computer 105 can apply the parameters to transform the data 115 into the sensor coordinate system. The computer 105 can use additional equations (not shown) dependent on the specific type of sensor 110 and type of data 115 collected to convert the data 115 into the sensor, vehicle, and global coordinate systems.

The computer 105 can determine a fractal dimension d for an image generated based on the data 115 with each set of parameters for six dimensions X, Y, Z, $\theta$, $\phi$, $\psi$ applied to the data 115, e.g., using a transformation such as shown in Equations 2-3. The computer 105 can store an initial set of parameters and determine a fractal dimension d for an image based on the initial set of parameters applied to the data 115. The initial set of parameters can be determined by, e.g., a manufacturer, and can be values determined from empirical data during sensor 110 diagnostic tests. Alternatively, the initial set of parameters can each have a value of 0. The computer 105 can generate new parameters, e.g., by incrementing the initial set of parameters by a fixed value (e.g., 0.01), by interpolating with a known method (e.g., Newton's method), etc., and determine a plurality of values for the fractal dimension d based on new sets of parameters. That is, each generated set of parameters for the dimensions X, Y, Z, $\theta$, $\phi$, $\psi$ can have an associated fractal dimension d determined by constructing an image from the data 115 with the set of parameters applied to the data 115. The computer 105 can continue to generate new parameters to a parameter end point, e.g., up to an upper parameter bound predetermined by the manufacturer or until a difference between the value for the fractal dimension d from the newest set of parameters and the fractal dimension d for the immediately previous set of factors is below a predetermined difference threshold.

The computer 105 can store the set of parameters associated with the lowest fractal dimension value as a set of calibrated parameters. With the calibrated parameters, the computer 105 can operate the sensor 110 to collect data 115 and more accurately analyze the data 115.

Figure 3:
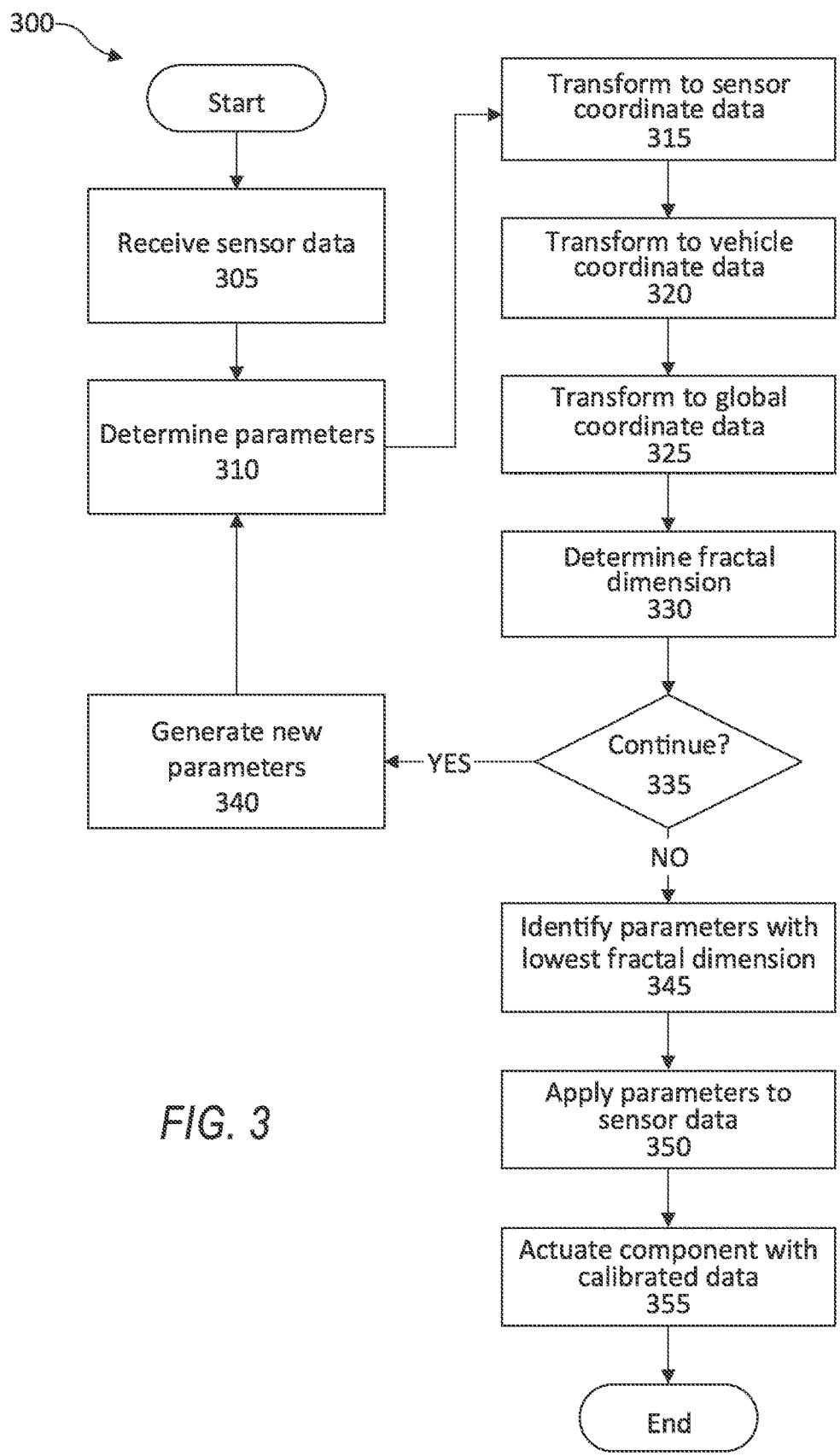
FIG. 3 is a block diagram of an example process for calibrating the sensors.

FIG. 3 illustrates an example process 300 for calibrating a sensor 110 in a vehicle 101 and operating the vehicle 101 with the calibrated sensor 110. The process 300 begins in a block 305, in which the computer 105 actuates the sensor 110 to collect data 115 from an environment around the vehicle 101. As described above, the computer 105 can actuate the sensor 110, e.g., a lidar 110, to collect data 115 from an area within a distance radius from the sensor 110. The data 115 can include data 115 in 3 spatial dimensions X, Y, Z and 3 rotational dimensions $\theta$, $\phi$, $\psi$.

Next, in a block 310, the computer 105 determines parameters to apply to the data 115. The parameters are numerical values that, when applied to the data 115, transform the data 115 into one of the sensor coordinate system, the vehicle coordinate system, or the global coordinate system. As described above, the computer 105 can apply the parameters to transform the raw data 115 from the sensor 110 into one of the coordinate systems.

Next, in a block 315, the computer 105 transforms the data 115 into a set of sensor coordinate data 115. As described above, the sensor coordinate data 115 can be values in a sensor coordinate system. The sensor coordinate system can be a spatial coordinate system with a point on the sensor 110 as the origin. The computer 105 can apply a set of parameters to transform the raw data 115 into the sensor coordinate data 115. For example, as shown in Equation 3, the computer 105 can use the parameters to convert raw data 115 into the sensor coordinate system.

Next, in a block 320, the computer 105 transforms the sensor coordinate data 115 into a set of vehicle coordinate data 115. As described above, the vehicle coordinate data 115 can be values in a vehicle coordinate system. The vehicle coordinate system can be a spatial coordinate system with a point on the vehicle 101 (e.g., an edge of a front bumper) at the origin. The computer 105 can apply a set of parameters to transform the sensor coordinate data 115 into the vehicle coordinate data 115.

Next, in a block 325, the computer 105 transforms the vehicle coordinate data 115 into a set of global coordinate data 115. As described above, the global coordinate data 115 can be values in a global coordinate system. The global coordinate system can be a spatial coordinate system with a predetermined point as the origin. The computer 105 can apply a set of parameters to transform the vehicle coordinate data 115 into the global coordinate data 115.

Next, in a block 330, the computer 105 determines a fractal dimension for the data 115. As described above, the fractal dimension is a measure of a curve, e.g., a non-integer Hausdorff dimension, a Minkowski dimension, etc., that describes a change in detail of the curve resulting from a change in measurement resolution of the curve. The computer 105 can determine the fractal dimension with, e.g., a box-counting algorithm, a space-filling function, a cost function, etc., as shown above in Equation 1. The computer 105 can apply the set of parameters to the data 115 to generate an image. The computer 105 can determine the fractal dimension by applying, e.g., the box-counting algorithm of Equation 1, to the image.

Next, in a block 335, the computer 105 determines whether to continue the process 300. The computer 105 can determine to continue the process 300 to generate new parameters to apply to the data 115 and determine the fractal dimension of the new parameters. If the computer 105 determines to continue, the process 300 continues in a block 340. Otherwise, the process 300 continues in a block 345.

In the block 340, the computer 105 generates new parameters to apply to the data 115. The computer 105 can generate the new parameters by, e.g., incrementing the previously used parameters by a fixed value (e.g., 0.01), decrementing the previously used parameters by a fixed value (e.g., 0.01), interpolating the previously used parameters with a fixed equation (e.g., with Newton's method), etc. The process 300 then returns to the block 310 with the new parameters.

In the block 345, the computer 105 determines the set of parameters corresponding the lowest fractal dimension in each coordinate system and stores the parameters. The computer 105 applies the set of parameters corresponding to the lowest fractal dimension to calibrate the sensors 110. Thus, with the determined parameters, the computer 105 can collect finer data 115, i.e., data 115 with smaller and more precise resolution, from the sensors 110. Finer data 115 allow the computer 105 to operate components 120 with greater precision, improving operation of the components 120 and the vehicle 101. The computer 105 can determine a set of parameters with the lowest fractal dimensions for the dimensions X, Y, Z, $\theta$, $\phi$, $\psi$ for each of the sensor coordinate system, the vehicle coordinate system, and the global coordinate system.

Next, in a block 350, the computer 105 applies the calibrated parameters to the raw sensor data 115 to generate calibrated data 115. The calibrated parameters can transform the data 115 into one of the coordinate systems described above, producing a virtual representation of an environment around the vehicle 101 that the computer 105 can use to actuate components 120. With the calibrated data 115, the computer 105 can more precisely actuate one or more vehicle components 120.

Next, in a block 355, the computer 105 actuates one or more vehicle components 120 based on the calibrated data 115. With the calibrated data 115, the computer 105 can actuate one or more components 120 to, e.g., steer the vehicle 101 within the virtual environment represented by the calibrated data 115. Following the block 355, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a processor; and a memory, the memory storing instructions executable by the processor to:
   receive image data from a vehicle sensor installed in a vehicle;
   transform the image data into global coordinate data;
   estimate fractal dimension values of the global coordinate data; and
   determine calibrated parameters based on the fractal dimension values to operate the vehicle sensor.

2. The system of claim 1, wherein the instructions further include instructions to estimate a fractal dimension value for each of a plurality of stored parameters used to transform the image data into the global coordinate data.

3. The system of claim 2, wherein the instructions further include instructions to determine the calibrated parameters by identifying stored parameters associated with smallest fractal dimension values of the global coordinate data.

4. The system of claim 1, wherein the parameters include parameters for six dimensions in a global coordinate system, and wherein the instructions further include instructions to determine a fractal dimension value for set of parameters for the six dimensions.

5. The system of claim 1, wherein the instructions further include instructions to transform the data with the parameters into sensor coordinate data and to transform the sensor coordinate data with the parameters into the global coordinate data.

6. The system of claim 5, wherein the instructions further include instructions to transform the sensor coordinate data with the parameters into vehicle coordinate data.

7. The system of claim 1, wherein the instructions further include instructions to actuate the sensor to collect data around the vehicle.

8. The system of claim 1, wherein the instructions further include instructions to receive data from a plurality of sensors and to determine the calibrated parameters based on the estimated fractal dimension values of the data from different sensors.

9. The system of claim 1, wherein the instructions further include instructions to estimate the fractal dimension values with a cost function.

10. The system of claim 1, wherein the instructions further include instructions to instruct the vehicle sensor to collect additional image data, apply the calibrated parameters to the collected image data to transform the additional image data into additional global coordinate data, and to actuate a vehicle component based on the additional global coordinate data.

11. A method, comprising:
    receiving image data from a vehicle sensor installed in a vehicle;
    transforming the image data into global coordinate data;
    estimating fractal dimension values of the global coordinate data; and
    determining calibrated parameters based on the fractal dimension values to operate the vehicle sensor.

12. The method of claim 11, further comprising estimating a fractal dimension value for each of a plurality of stored parameters used to transform the image data into the global coordinate data.

13. The method of claim 12, further comprising determining the calibrated parameters by identifying stored parameters associated with smallest fractal dimension values of the global coordinate data.

14. The method of claim 11, wherein the parameters include parameters for six dimensions in a global coordinate system, and wherein the method further comprises determining a fractal dimension value for each set of parameters for the six dimensions.

15. The method of claim 11, further comprising transforming the data with the parameters into sensor coordinate data and transforming the sensor coordinate data with the parameters into the global coordinate data.

16. The method of claim 11, further comprising receiving data from a plurality of sensors and determining the calibrated parameters based on the estimated fractal dimension values of the data from different sensors.

17. A system, comprising:
    sensing means to provide data; and
    a computer programmed to:
    receive image data from a vehicle sensor installed in a vehicle;
    transform the image data into global coordinate data;
    estimate fractal dimension values of the global coordinate data; and
    determine calibrated parameters based on the fractal dimension values to operate the vehicle sensor.

18. The system of claim 17, wherein the computer is further programmed to estimate a fractal dimension value for each of a plurality of stored parameters used to transform the image data into the global coordinate data.

19. The system of claim 17, wherein the computer is further programmed to determine the calibrated parameters by identifying stored parameters associated with smallest fractal dimension values of the global coordinate data.

20. The system of claim 17, wherein the computer is further programmed to receive data from a plurality of sensors and to determine the calibrated parameters based on the estimated fractal dimension values of the data from different sensors.

* * * * *